US012676109B2

(12) United States Patent
Zhang et al.

(10) Patent No.: US 12,676,109 B2
(45) Date of Patent: Jul. 7, 2026

(54) METHOD FOR SENSING PIXEL INTERNAL DATA, DISPLAY DEVICE AND STORAGE MEDIUM

(71) Applicants: Hefei BOE Joint Technology Co., Ltd., Hefei (CN); BOE Technology Group Co., Ltd., Beijing (CN)

(72) Inventors: Yao Zhang, Beijing (CN); Wenchao Bao, Beijing (CN); Song Meng, Beijing (CN); Xiaolong Wei, Beijing (CN); Miao Liu, Beijing (CN); Cheng Xu, Beijing (CN)

(73) Assignees: HEFEI BOE JOINT TECHNOLOGY CO. , LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 189 days.

(21) Appl. No.: 18/287,305

(22) PCT Filed: Jan. 6, 2023

(86) PCT No.: PCT/CN2023/071019
§ 371 (c)(1),
(2) Date: Oct. 18, 2023

(87) PCT Pub. No.: WO2024/145920
PCT Pub. Date: Jul. 11, 2024

(65) Prior Publication Data

US 2025/0078746 A1 Mar. 6, 2025

(51) Int. Cl.
*G09G 3/3233* (2016.01)

(52) U.S. Cl.
CPC ..... *G09G 3/3233* (2013.01); *G09G 2320/029* (2013.01); *G09G 2330/10* (2013.01)

(58) Field of Classification Search
CPC ........... G09G 3/3233; G09G 2320/029; G09G 2330/10; G09G 3/00
See application file for complete search history.

(56) References Cited

U.S. PATENT DOCUMENTS 10,504,465 B2 * 12/2019 Li ........................ G09G 3/3677
10,971,105 B2 * 4/2021 Chen .................... G09G 3/3688
(Continued)

FOREIGN PATENT DOCUMENTS

CN 107170400 A 9/2017
CN 109545113 A 3/2019
(Continued)

OTHER PUBLICATIONS

Dictionary.com, "adjacent," in Dictionary.com Unabridged. Source location: Random House, Inc. http://dictionary.reference.com/browse/adjacent, Nov. 18, 2011, p. 1.*

*Primary Examiner* — Jeff Piziali
(74) *Attorney, Agent, or Firm* — XSENSUS LLP

(57) ABSTRACT

Provided is a method for sensing pixel internal data in a display device. The method includes: sensing pixel internal data for each line of pixel units to determine column sequence numbers of suspected abnormal pixel units in the line of pixel units; determining, based on a number of the suspected abnormal pixel units of each column sequence number in the at least three lines of pixel units, whether a sensing signal line corresponding to the column sequence number is an abnormal sensing signal line; and in a case that there is at least one abnormal sensing signal line, replacing pixel internal data of a column of pixel units corresponding to each abnormal sensing signal line with pixel internal data of at least one column of pixel units adjacent to the abnormal sensing signal line each time the pixel internal data of all pixel units is sensed.

15 Claims, 5 Drawing Sheets

(56) References Cited

U.S. PATENT DOCUMENTS

| | | | | |
|---|---|---|---|---|
| 11,151,958 | B2 * | 10/2021 | Huang | G09G 3/3696 |
| 11,984,086 | B2 * | 5/2024 | An | G09G 3/3291 |
| 2015/0077412 | A1 * | 3/2015 | Nakamura | G09G 3/2007 345/212 |
| 2016/0125810 | A1 * | 5/2016 | Lai | G09G 3/3275 345/212 |
| 2016/0133193 | A1 * | 5/2016 | Lee | G09G 3/3275 345/694 |
| 2018/0204519 | A1 * | 7/2018 | Xu | G09G 3/3233 |
| 2019/0005902 | A1 * | 1/2019 | Chen | G09G 3/3648 |
| 2019/0279574 | A1 * | 9/2019 | Kim | G11C 19/287 |
| 2019/0318694 | A1 * | 10/2019 | Kwon | G09G 3/3275 |
| 2020/0104282 | A1 | 4/2020 | Bao et al. | |
| 2020/0143723 | A1 | 5/2020 | Kim et al. | |
| 2021/0020105 | A1 * | 1/2021 | Yin | G09G 3/3275 |
| 2021/0065605 | A1 * | 3/2021 | Liu | G09G 3/3607 |
| 2021/0201761 | A1 * | 7/2021 | Yin | G09G 3/32 |
| 2021/0225289 | A1 * | 7/2021 | Wang | G09G 3/3291 |
| 2022/0068234 | A1 * | 3/2022 | Lin | G09G 3/3677 |
| 2022/0286747 | A1 | 9/2022 | Choi et al. | |
| 2022/0301489 | A1 * | 9/2022 | Wang | G09G 3/32 |
| 2022/0310007 | A1 * | 9/2022 | Zhou | G09G 3/3233 |
| 2023/0260450 | A1 * | 8/2023 | Zhang | G09G 3/32 345/55 |
| 2024/0038136 | A1 * | 2/2024 | Cai | G09G 3/20 |

FOREIGN PATENT DOCUMENTS

| | | | | | |
|---|---|---|---|---|---|
| CN | 109637453 | A | | 4/2019 | |
| CN | 111145673 | A | | 5/2020 | |
| CN | 114373413 | A | * | 4/2022 | G09G 3/006 |
| KR | 2017-0015596 | A | | 2/2017 | |
| KR | 102347837 | B1 | * | 1/2022 | G09G 3/3233 |

* cited by examiner

METHOD FOR SENSING PIXEL INTERNAL DATA, DISPLAY DEVICE AND STORAGE MEDIUM

The present disclosure is a U.S. national stage of international application No. PCT/CN2023/071019, filed on Jan. 6, 2023, the disclosure of which is herein incorporated by reference in its entirety.

TECHNICAL FIELD

The present disclosure relates to the field of displaying technologies, and more particularly, to a method and apparatus for sensing pixel internal data in a display device, the display device and a computer storage medium.

BACKGROUND

To achieve better display effects or additional application functions, some display apparatuses are equipped with sensors or similar structures inside a pixel unit, and an external circuit reads and processes sensing signals through a sensing signal line disposed between the pixel units to realize the sensing of pixel internal data such as temperature, pressure, light intensity and threshold voltage inside the pixel units.

SUMMARY

Embodiments of the present disclosure provide a method and apparatus for sensing pixel internal data in a display device, the display device, and a computer storage medium.

Some embodiments of the present disclosure provide a method for sensing pixel internal data in a display device, the display device including a plurality of pixel units and a plurality of sensing signal lines, the plurality of pixel units being arranged in multiple lines and multiple columns, and each sensing signal line being connected to at least three pixel units in a column of pixel units corresponding to the sensing signal line; the methods includes:

- sensing pixel internal data for each line of pixel units to determine column sequence numbers of suspected abnormal pixel units in the line of pixel units, the suspected abnormal pixel units being pixel units in which the pixel internal data as sensed meets an abnormality determination condition;
- determining, based on a number of the suspected abnormal pixel units of each column sequence number in the at least three lines of pixel units, whether a sensing signal line corresponding to the column sequence number is an abnormal sensing signal line; and
- in a case that there is at least one abnormal sensing signal line, replacing pixel internal data of a column of pixel units corresponding to each abnormal sensing signal line with pixel internal data of at least one column of pixel units adjacent to the abnormal sensing signal line during at least one full-screen sensing process.

In some embodiments, prior to sensing the pixel internal data for each line of pixel units, the method further includes:

- selecting at least three line sequence numbers randomly or equidistantly to determine multiple lines of pixel units corresponding to the at least three line sequence numbers as the at least three lines of pixel units in which the pixel internal data is to be sensed.

In some embodiments, the determining, based on the number of the suspected abnormal pixel units of each column sequence number in the at least three lines of pixel units, whether the sensing signal line corresponding to the column sequence number is the abnormal sensing signal line includes:

- in a process of sensing the pixel internal data of the at least three lines of pixel units line by line to determine the column sequence numbers of the suspected abnormal pixel units in each line, in a case that any of the column sequence numbers appears consecutively for m times among consecutive m lines, determining the sensing signal line corresponding to the column sequence number as the abnormal sensing signal line, and no longer performing a separate operation to determine whether the sensing signal line corresponding to the column sequence number is the abnormal sensing signal line;
- in the process of sensing the pixel internal data of the at least three lines of pixel units line by line to determine the column sequence numbers of the suspected abnormal pixel units in each line, in a case that any of the column sequence numbers does not appear consecutively for n times among consecutive n lines, determining the sensing signal line corresponding to the column sequence number as a normal sensing signal line, and no longer performing the separate operation to determine whether the sensing signal line corresponding to the column sequence number is the abnormal sensing signal line; and
- in the process of sensing the pixel internal data of the at least three lines of pixel units line by line to determine the column sequence numbers of the suspected abnormal pixel units in each line, in a case that a result indicating whether each of the sensing signal lines is the abnormal sensing signal line has been determined, stopping the sensing of the pixel internal data of the at least three lines of pixel units line by line,
- the m being an integer not less than 2, the n being an integer not less than 3.

In some embodiments, the determining, based on the number of the suspected abnormal pixel units of each column sequence number in the at least three lines of pixel units, whether the sensing signal line corresponding to the column sequence number is the abnormal sensing signal line further includes:

- in the process of sensing the pixel internal data of the at least three lines of pixel units line by line to determine the column sequence numbers of the suspected abnormal pixel units in each line, in a case that any of the column sequence numbers appears for x times among different lines, determining the sensing signal line corresponding to the column sequence number as the abnormal sensing signal line, and no longer performing the separate operation to determine whether the sensing signal line corresponding to the column sequence number is the abnormal sensing signal line; and
- in the process of sensing the pixel internal data of the at least three lines of pixel units line by line to determine the column sequence numbers of the suspected abnormal pixel units in each line, in a case that any of the column sequence numbers does not appear for y times among different lines, determining the sensing signal line corresponding to the column sequence number as the normal sensing signal line, and no longer performing the separate operation to determine whether the sensing signal line corresponding to the column sequence number is the abnormal sensing signal line, wherein the x is an integer not less than 2, and the y is equal to a number of lines of at least three lines of pixel units minus the x plus 1.

In some embodiments, the display device further includes an internal memory and an external memory. The method further includes:

each time the display device is switched on, detecting whether the abnormal sensing signal line is present in the plurality of sensing signal lines, and storing a detection result in the internal memory for use in the at least one full-screen sensing process;

or, updating and storing in the external memory the detection result each time whether the abnormal sensing signal line is present in the plurality of sensing signal lines is detected, and reading the detection result stored in the external memory into the internal memory each time the display device is switched on, for use in the at least one full-screen sensing process.

In some embodiments, the abnormality determination condition includes at least one of the following conditions:

a value of the pixel internal data of the pixel unit is greater than a set upper limit value;

the value of the pixel internal data of the pixel unit is less than a set lower limit value;

the value of the pixel internal data of the pixel unit exceeds a set value range;

a difference between the value of the pixel internal data of the pixel unit and a value of pixel internal data of a column of pixel units previous to a current column is greater than a set value;

a difference between the value of the pixel internal data of the pixel unit and a value of pixel internal data of a column of pixel units next to the current column is greater than a set value; and a difference between the value of the pixel internal data of the pixel unit and a value of history pixel internal data of the pixel unit is greater than a set value.

In some embodiments, each of the sensing signal lines has a one-to-one correspondence with a column of the plurality of pixel units; and the number of the suspected abnormal pixel units of a column sequence number corresponding to the abnormal sensing signal line among at least three lines of pixel units is not less than 2.

In some embodiments, the replacing the pixel internal data of the column of pixel units corresponding to each abnormal sensing signal line with the pixel internal data of at least one column of pixel units adjacent to the abnormal sensing signal line during the at least one full-screen sensing process includes:

during an odd-numbered full-screen sensing, replacing the pixel internal data of the column of pixel units corresponding to each abnormal sensing signal line with pixel internal data of a column of pixel units on a left side of the abnormal sensing signal line; and during an even-numbered full-screen sensing, replacing the pixel internal data of the column of pixel units corresponding to each abnormal sensing signal line with pixel internal data of a column of pixel units on a right side of the abnormal sensing signal line;

or, during an odd-numbered full-screen sensing, replacing the pixel internal data of the column of pixel units corresponding to each abnormal sensing signal line with pixel internal data of a column of pixel units on a right side of the abnormal sensing signal line; and during an even-numbered full-screen sensing, replacing the pixel internal data of the column of pixel units corresponding to each abnormal sensing signal line with pixel internal data of a column of pixel units on a left side of the abnormal sensing signal line.

In some embodiments, the replacing the pixel internal data of the column of pixel units corresponding to each abnormal sensing signal line with the pixel internal data of at least one column of pixel units adjacent to the abnormal sensing signal line during the at least one full-screen sensing process includes:

during an odd-numbered full-screen sensing, replacing the pixel internal data of the column of pixel units corresponding to each abnormal sensing signal line with pixel internal data of a column of pixel units on a right side of the abnormal sensing signal line; and during an even-numbered full-screen sensing, replacing the pixel internal data of the column of pixel units corresponding to each abnormal sensing signal line with an average value of pixel internal data of a column of pixel units on a left side of the abnormal sensing signal line and the pixel internal data of the column of pixel units on the right side of the abnormal sensing signal line;

or, during an odd-numbered full-screen sensing, replacing the pixel internal data of the column of pixel units corresponding to each abnormal sensing signal line with an average value of pixel internal data of a column of pixel units on a left side of the abnormal sensing signal line and pixel internal data of a column of pixel units on a right side of the abnormal sensing signal line; and during an even-numbered full-screen sensing, replacing the pixel internal data of the column of pixel units corresponding to each abnormal sensing signal line with the pixel internal data of the column of pixel units on the right side of the abnormal sensing signal line.

In some embodiments, the pixel internal data includes at least one of temperature, pressure, voltage, current, and light intensity.

In some embodiments, the pixel internal data includes data of a threshold voltage of a transistor inside the pixel unit.

In some embodiments, the abnormality determination condition for the suspected abnormal pixel unit includes: a difference between a value of pixel internal data of a current pixel unit and a value of pixel internal data of a pixel unit in a column previous to the current pixel unit is greater than an upper limit value, and a difference between the value of the pixel internal data of the current pixel unit and a value of pixel internal data of a pixel unit in a column next to the current pixel unit is greater than the upper limit value, the upper limit value being equal to one-fourth of a theoretical maximum value of the pixel internal data.

Some embodiments of the present disclosure provide a display device. The display device includes a processor, a memory, a plurality of pixel units and a plurality of sensing signal lines, the plurality of pixel units being arranged in multiple lines and multiple columns, and each of the sensing signal lines being connected to at least three pixel units in a column of pixel units corresponding to the sensing signal line; and the memory is configured to store at least one instruction, at least one program, a code set, or an instruction set therein, and the at least one instruction, the at least one program, the code set or the instruction set, when loaded and executed by the processor, causes the processor to perform any of the above methods for sensing the pixel internal data in the display device.

Some embodiments of the present disclosure provide a non-transitory computer storage medium, the non-transitory computer storage medium being configured to store at least one instruction, at least one program, a code set or an instruction set therein, wherein the at least one instruction, the at least one program, the code set or the instruction set, when loaded and executed by a processor, causes the processor to perform any of the above methods for the sensing pixel internal data in the display device.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

Through the above drawings, the specific embodiments of the present disclosure have been shown, which will be described in more detail later. These drawings and text descriptions are not intended to limit the scope of the concept of the present disclosure in any way, but to explain the concept of the present disclosure for those skilled in the art by referring to the specific embodiments.

DETAILED DESCRIPTION

To make the objectives, technical solutions, and advantages of the present disclosure clearer, the following further describes implementations of the present disclosure in detail with reference to the accompanying drawings.

In some practices, since a plurality of pixel units arranged in the array output the sensing signals through the same sensing signal line, the internal fault of a single pixel unit may not only lead to the abnormality of sensing signals outputted by itself, but also make the pixel units connected to the same sensing signal line unable to output the sensing signals normally, resulting in a serious fault generally known as "undesirable longitudinal line" or "undesirable point and strip line".

Figure 1:
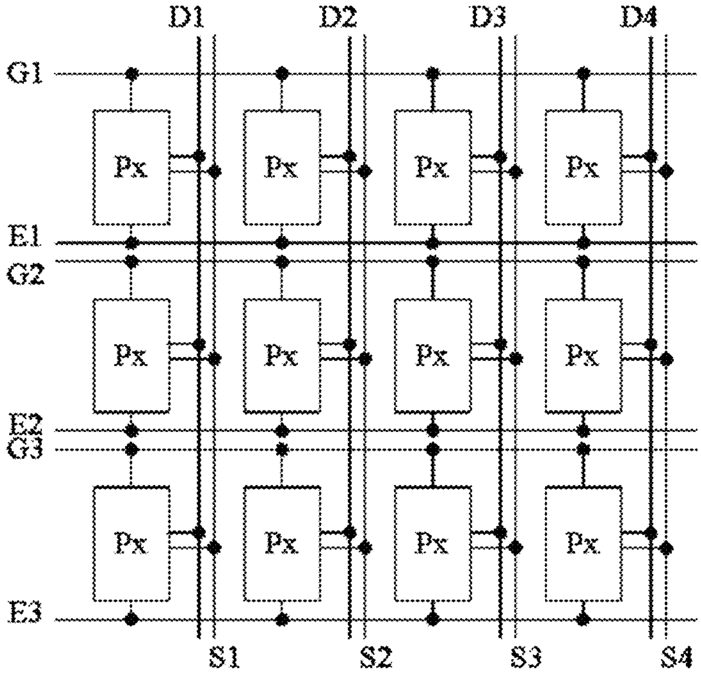
FIG. 1 is a schematic diagram of an internal structure of a display device according to some practices.

FIG. 1 is a schematic diagram of an internal structure of a display device according to some practices. Referring to FIG. 1, the display device includes a plurality of pixel units Px arranged in multiple lines and multiple columns (three lines and four columns are shown in FIG. 1 as an example), as well as a plurality of first gate lines (three first gate lines G1, G2, and G3 are shown in FIG. 1 as an example), a plurality of second gate lines (three second gate lines E1, E2, and E3 are shown in FIG. 1 as an example), a plurality of data lines (four data lines D1, D2, D3 and D4 are shown in FIG. 1 as an example), and a plurality of sensing signal lines (four sensing signal lines S1, S2, S3, and S4 are shown in FIG. 1 as an example). Each first gate line is disposed between two adjacent lines of pixel units Px, each second gate line is disposed between two adjacent lines of pixel units Px, each data line is disposed between two adjacent columns of pixel units Px, and each sensing signal line is disposed between two adjacent columns of pixel units Px. Each line of pixel units Px is connected to the same first gate line to synchronously perform the operation of writing display data by receiving the same gate drive signal. Each column of pixel units Px is connected to the same data line to receive respective data signals from the same data line in turn by receiving different gate drive signals. Each line of pixel units Px is connected to the same second gate line to synchronously perform the operation of sensing pixel internal data by receiving the same sensing switching signal. Each column of pixel units Px is connected to the same sensing signal line to output respective sensing signals in turn using the same sensing signal line by receiving different sensing switching signals. The pixel internal data refers to data to be sensed at a location where the pixel unit is disposed, such as temperature, pressure, voltage (e.g., a threshold voltage of a drive transistor), current, and light intensity. Based on the above connection relationship, when a fault occurs inside a pixel unit Px, in addition to an abnormal phenomenon that may occur at this pixel unit Px, other pixel units Px in the same line or column as this pixel unit Px may also be affected.

Taking the display device shown in FIG. 1 as an example, when the pixel unit Px at the upper left corner has a circuit fault during use and thus a sensing signal line S1 is short-circuited to a low-level voltage line Vss inside the pixel unit Px, the voltage on this sensing signal line S1 is fixed to a low-level voltage and cannot normally transmit sensing signals outputted by the respective pixel units Px, which causes the column of pixel units Px connected to the sensing signal line S1 to exhibit the same abnormal phenomenon. For example, when the above sensing signal is configured to compensate for the data voltage supplied to each pixel unit Px, the above fault causes the column of pixel units Px to receive an overcompensated or undercompensated data voltage from the data line D1, resulting in a column of bright lines/dark lines/color abnormal lines on the screen of the display device, that is, a display fault generally known as "undesirable longitudinal line" or "undesirable point and strip line".

Figure 2:
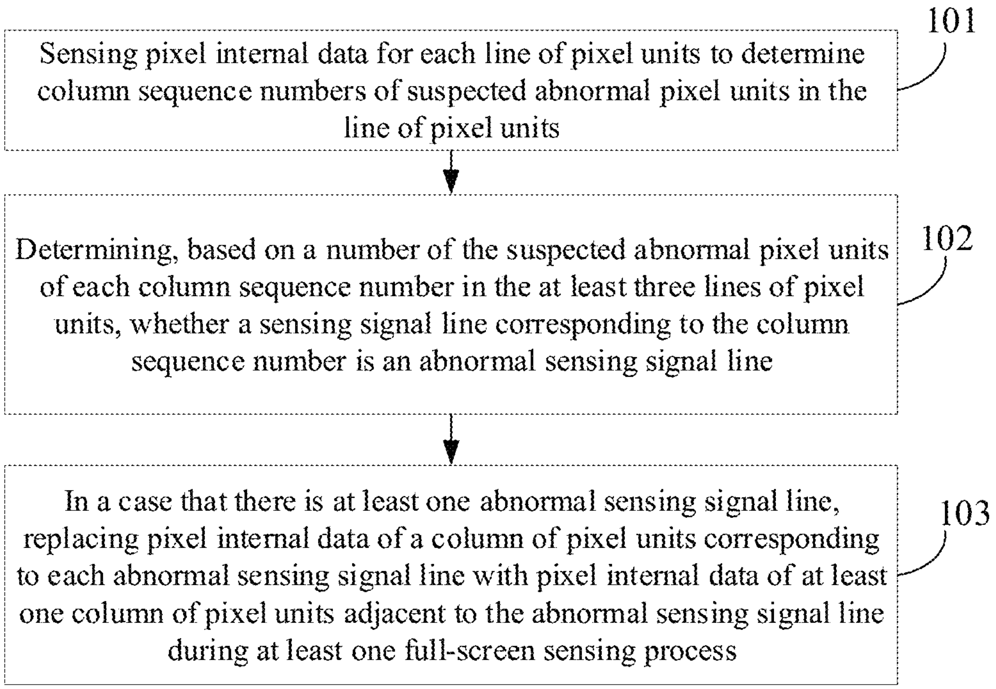
FIG. 2 is a flowchart of a method for sensing pixel internal data in a display device according to some embodiments of the present disclosure.

In view of the above problems, some embodiments of the present disclosure provide a method for sensing pixel internal data in the display device, which can facilitate mitigating or eliminating the undesirable phenomenon caused by the output of abnormal pixel internal data from the entire column when the fault occurs. FIG. 2 is a schematic diagram of a flowchart of a method for sensing pixel internal data in a display device according to some embodiments of the present disclosure. Referring to FIG. 2, the method includes the following steps.

In step 101, pixel internal data is sensed for each of at least three lines of pixel units to determine column sequence numbers of suspected abnormal pixel units in the line of pixel units.

The at least three lines of pixel units are preset in multiple lines of pixel units or randomly selected before or during the step 101, the number of which is set in advance according to the required fault column detection accuracy and processing time. The specific number is, for example, 3 lines, 4 lines, 5 lines, 6 lines, 7 lines, 8 lines, 9 lines, 10 lines or more. The suspected abnormal pixel units are pixel units in which the pixel internal data as sensed meets an abnormality determination condition. The abnormality determination condition is one or more conditions for determining whether the pixel internal data as sensed is within a normal range, and is set according to empirical or experimental data.

In step 102, whether a sensing signal line corresponding to the column sequence number is an abnormal sensing signal line is determined based on a number of the suspected abnormal pixel units of each of the column sequence numbers in the at least three lines of pixel units. The number of suspected abnormal pixel units of the column sequence number corresponding to the abnormal sensing signal line is preset, such as 2, 3, 4, 5, or more. In some embodiments, the at least three pixel units are adjacent to each other.

In step 103, in the case that there is at least one of the abnormal sensing signal lines, the pixel internal data of a column of pixel units corresponding to each of the abnormal sensing signal lines is replaced with the pixel internal data of at least one adjacent column of pixel units during at least one full-screen sensing process.

In one example, for the fault case in which the sensing signal line S1 in FIG. 1 is short-circuited to the low-level voltage line Vss inside the pixel unit Px at the upper left corner: it is determined by the step 101 that there are suspected abnormal pixel units with the same column sequence number (the column sequence number is 1, corresponding to the sensing signal line S1) in multiple lines (taking three lines as an example) of the pixel units Px (that is, the pixel units connected to the sensing signal line S1 are all suspected fault pixel units); it is determined by the step 102 that the number of suspected abnormal pixel units with the column sequence number of 1 in the three lines of pixel units Px is 3, so as to determine that the sensing signal line S1 is the abnormal sensing signal line; and by means of the step 103, in each full-screen sensing process, the pixel internal data of a column of pixel units corresponding to the sensing signal line S1 is replaced with the pixel internal data of pixel units of the adjacent column. In this way, according to the method in the embodiments of the present disclosure, the sensing signal line S1 that outputs the abnormal pixel internal data is detected, and the abnormal pixel internal data is replaced with the pixel internal data of the pixel units of the adjacent column (e.g., the left column or the right column) during at least one full-screen sensing process (e.g., each full-screen sensing), so as to shield the abnormal pixel internal data outputted by the sensing signal line S1, thereby facilitating mitigating or eliminating the resulting undesirable phenomena.

It can be seen from the embodiments of the present disclosure that, by sensing the pixel internal data for a few lines of pixel units, the suspected abnormal pixel unit in which the pixel internal data meets the abnormality determination condition is determined. Based on the number of suspected abnormal pixel units in the same column, whether a fault has occurred to cause the entire column of pixel units to output abnormal pixel internal data is determined. In the case that the fault has occurred, the sensing signal line of the fault column is determined as the abnormal sensing signal line, and the pixel internal data of the pixel unit in the fault column is replaced by the pixel internal data of the adjacent column of pixel units each time all pixel units are sensed. That is, the fault column is detected and shielded in the display device, which can facilitate mitigating or eliminating the undesirable phenomenon caused by the abnormal pixel internal data outputted from the entire column when the fault occurs, and also facilitate improving the performance and reliability of the display device.

In some examples, in order not to solidify the data of the abnormal sensing signal line (for example, the pixel internal data of the pixel units in the left column or the right column is used for replacement in each full-screen sensing process, which is easy to lead to the data solidification of the abnormal sensing signal line), during the odd-numbered full-screen sensing, the pixel internal data corresponding to the abnormal sensing signal line is replaced with normal data of a column of pixel units on the left side of the abnormal sensing signal line; and during the even-numbered full-screen sensing, the pixel internal data corresponding to the abnormal sensing signal line is replaced with normal data of a column of pixel units on the right side of the abnormal sensing signal line. Alternatively, during the odd-numbered full-screen sensing, the pixel internal data corresponding to the abnormal sensing signal line is replaced with normal data of a column of pixel units on the right side of the abnormal sensing signal line; and during the even-numbered full-screen sensing, the pixel internal data corresponding to the abnormal sensing signal line is replaced with normal data of a column of pixel units on the left side of the abnormal sensing signal line.

In some examples, in order not to solidify the data of the abnormal sensing signal line (for example, the pixel internal data of the pixel units in the left column or the right column is used for replacement in each full-screen sensing process, which is easy to lead to the data solidification of the abnormal sensing signal line), during the odd-numbered full-screen sensing, the pixel internal data corresponding to the abnormal sensing signal line is replaced with normal data of a column of pixel units on the left side or right side of the abnormal sensing signal line; and during the even-numbered full-screen sensing, the pixel internal data corresponding to the abnormal sensing signal line is replaced with the average value of the pixel internal data of a column of pixel units on the left side and the pixel internal data of a column of pixel units on the right side of the abnormal sensing signal line as normal data. Alternatively, during the odd-numbered full-screen sensing, the pixel internal data corresponding to the abnormal sensing signal line is replaced with the average value of the pixel internal data of a column of pixel units on the left side of the abnormal sensing signal line and the pixel internal data of a column of pixel units on the right side of the abnormal sensing signal line as normal data; and during the even-numbered full-screen sensing, the pixel internal data corresponding to the abnormal sensing signal line is replaced with normal data of a column of pixel units on the left side or right side of the abnormal sensing signal line.

In some examples, if the number of detection lines for sensing the pixel internal data of the pixel units is N lines, and N is greater than or equal to 3 (for example, the number of detection lines is 10 lines, N=10), three line sequence numbers in the same column are selected for making determination, and whether a fault has occurred to cause the entire column of pixel units to output abnormal pixel internal data is further determined in consideration of detecting whether the sensing signal lines of the three line sequence numbers in the same column are abnormal. For example, the pixel unit lines corresponding to the three line sequence numbers in the same column are the first, last, and intermediate lines of a selected N-line square matrix. Assuming N=7, lines 1, 4, and 7 in the first column are selected. Assuming N=8, lines 1, 4, or 5, and 8 in the first column are selected. It should be noted that with respect to the display device to which the method in the embodiments of the present disclosure applies, the pixel unit in some examples is a unit including a monochrome sub-pixel, and in other examples is a pixel unit including a plurality of sub-pixels of different colors. Moreover, in consideration of the specific application requirements, the display device may not need to sense the pixel internal data for each of the pixel units in multiple lines and multiple columns (for example, pixel internal data such as temperature and light intensity is sensed by a pixel unit representing a small display area centered on this pixel unit, and only this pixel unit in the display area is connected with a sensing signal line). At this time, the method in the embodiments of the present disclosure is used only by meeting the following condition: each sensing signal line is connected to at least three pixel units in the corresponding column of pixel units (i.e., the number of pixel units connected to the sensing signal line needs to be not less than the number of lines of pixel units detected in step 101 and step 102 above). In some examples, each sensing signal line has a one-to-one correspondence relationship with a column of the plurality of pixel units, that is, each sensing signal line only corresponds to a column of pixel units and is not connected across columns.

It should also be noted that the method in the embodiments of the present disclosure is used to detect a fault case in which a whole column of pixel units fails to normally provide pixel internal data (i.e., the sensing signal line corresponding to the foregoing column sequence number is the abnormal sensing signal line, and it should be understood that there are many possible factors that cause this phenomenon, and not necessarily a short-circuit or open-circuit abnormality of the sensing signal line itself), and to mitigate or eliminate the undesirable phenomena caused by the fault, wherein the above steps 101 and 102 achieve once detection of abnormal sensing signal lines, and the above step 103 shields the abnormal sensing signal lines according to the detection results when the fault occurs. It should be understood that the detection operation for the abnormal sensing signal line is repeated many times with the change of the working state of the display device to continuously update the detection results, so as to determine the abnormal sensing signal line to be shielded during each full-screen sensing process. It should also be understood that the abnormality determination condition and a determination standard of the abnormal sensing signal line used in the detection of the abnormal sensing signal line implemented in steps 101 and 102 above are set by a technician according to the types and characteristics of actual pixel internal data and the experimental measurement in combination with actual application requirements, thereby implementing a detection process that meets the requirements.

In one example, the internal pixel data is data of a threshold voltage of a transistor inside the pixel unit. The abnormality determination condition for the suspected abnormal pixel unit is set as "a difference between the value of the pixel internal data of the current pixel unit and the value of the pixel internal data of the pixel unit in the previous column and the difference between the value of the pixel internal data of the current pixel unit and the value of the pixel internal data of the pixel unit in the next column both are greater than an upper limit value, the upper limit value being equal to one-fourth of a theoretical maximum value of the pixel internal data" (for example, if the threshold voltage of a type of transistor, i.e., the theoretical maximum value of the pixel internal data is 1500 mV, the upper limit value is equal to 1500/4=375 mV). In addition, pixel internal data of four lines of pixel units with line sequence numbers equal to ⅛, ⅜, ⅝, and ⅞ of the total number of lines respectively (for example, for a display device with a resolution of 2560*1600, the total number of lines is 2560, and the above four lines of pixel units are pixel units in lines 320, 960, 1600 and 2240) is sensed. The sensing signal lines with three or more suspected abnormal pixel units of the corresponding column sequence number in the four lines are determined as the above abnormal sensing signal lines. After experimental measurements, the above configuration has a shorter detection time under the premise of meeting the application requirements in terms of detection accuracy. In addition, compared with the determination method, e.g., "the sensing signal line in which all pixel units are suspected abnormal pixel units of the corresponding column sequence numbers in the four lines is determined as the above abnormal sensing signal line", the above determination method can reduce the adverse impact of other faults or one-line pixel unit determination errors on the determination process, thereby facilitating improving the accuracy of detection.

Taking the above abnormality determination condition as an example, in other examples, the abnormality determination conditions further includes any of one or more conditions: a value of the pixel internal data of the pixel unit is greater than a set upper limit value (e.g., the above theoretical maximum of 1500 mV); the value of the pixel internal data of the pixel unit is less than a set lower limit value (the lower limit value is, for example, 1 mV, that is, the pixel internal data equal to zero is regarded as a suspected abnormality); the value of the pixel internal data of the pixel unit exceeds a set value range (the value range is, for example, 1-1500 mV); a difference between the value of the pixel internal data of the pixel unit and the value of the pixel internal data of the column of pixel units previous to the current column is greater than a set value (the set value is, for example, 375 mV above); a difference between the value of the pixel internal data of the pixel unit and the value of the pixel internal data of the column of pixel units next to the current column is greater than a set value (the set value is, for example, 375 mV above); and a difference between the value of the pixel internal data of the pixel unit and the value of history pixel internal data of this pixel unit is greater than a set value (the set value is, for example, 375 mV above). It should be understood that more complex abnormality determination conditions can more accurately determine the suspected abnormal pixel units, while simpler abnormality determination conditions can shorten the processing time of detection.

Figure 3:
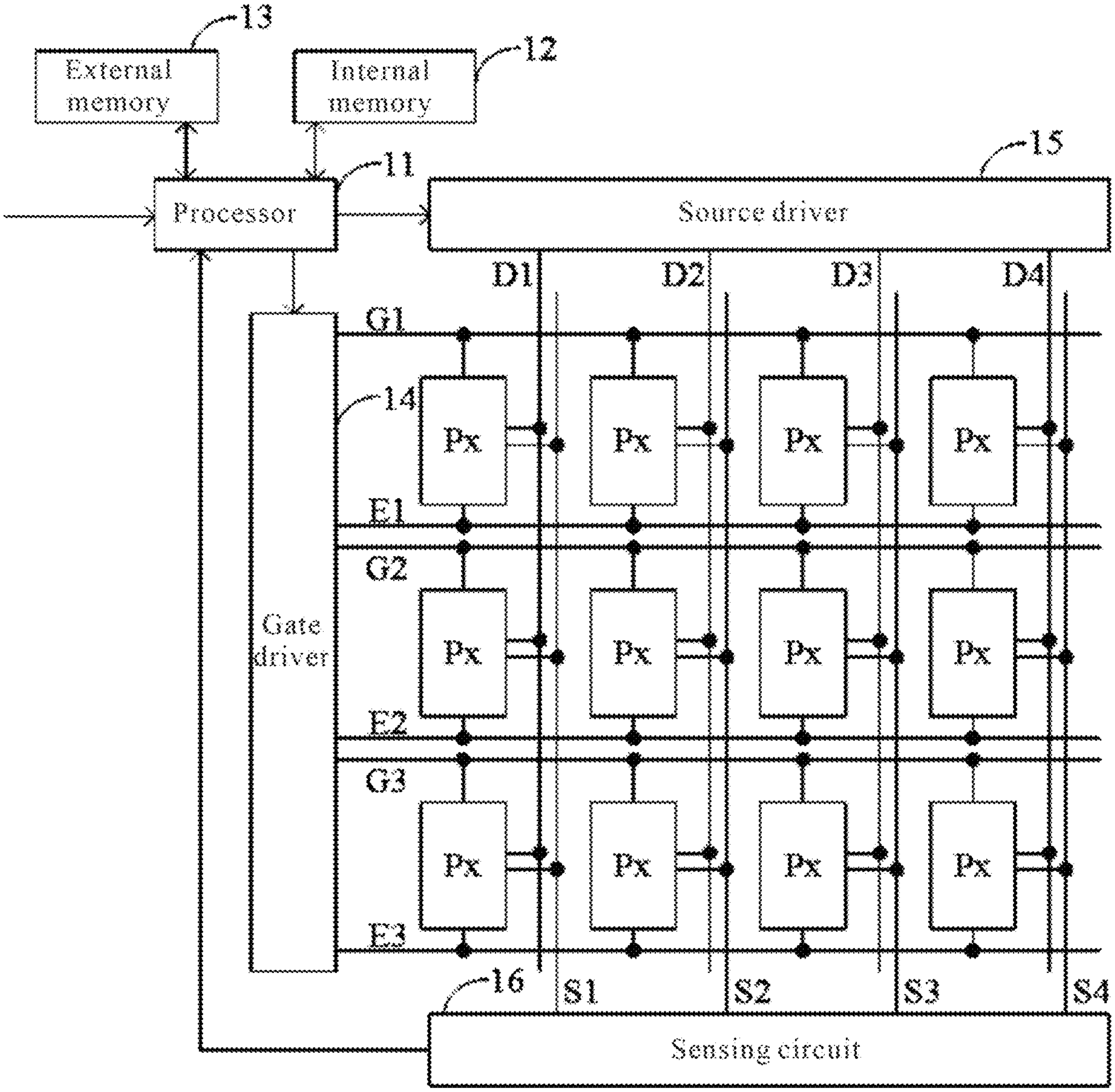
FIG. 3 is a structural block diagram of a display device according to some embodiments of the present disclosure.

FIG. 3 is a structural block diagram of a display device according to some embodiments of the present disclosure. The display device provided by the embodiments of the present disclosure is any product or component having a display function, such as a display panel, a mobile phone, a tablet computer, a television, a display, a laptop computer, a digital photo frame, or a navigator. In one example, the display device is an electroluminescent device, such as a display device based on organic light-emitting diode (OLED), a quantum dot light-emitting diode (QLED), or a Micro-LED. Referring to FIG. 3, in addition to including the structure in a display region shown in FIG. 1, the display device shown in FIG. 3 further includes a processor 11, an internal memory 12 (transitory memory medium or random access memory RAM), an external memory 13 (non-transitory memory medium), a gate driver 14, a source driver 15, and a sensing circuit 16. The external memory 13 is configured to store at least one instruction, at least one program, a code set or an instruction set therein, the at least one instruction, the at least one program, the code set or the instruction set being loaded and executed by the processor to implement any of the above methods for sensing the pixel internal data in the display device according to the embodiments of the present disclosure.

Referring to FIG. 3, the processor 11 is connected to the internal memory 12 and the external memory 13, respectively, so that the internal memory 12 and/or the external memory 13 can read and write data, and can receive display data from an external display interface to generate a plurality of control signals for display. The processor 11 is also connected to the gate driver 14, and the gate driver 14 is connected to each first gate line and each second gate line, respectively, so that the processor 11 can control the gate driver 14 by the control signals to provide the gate drive signals and sensing switching signals to the first gate line and the second gate line. The source driver 15 is connected to each data line. The processor 11 is also connected to the source driver 15, so that the processor 11 can control the source driver 15 by the control signals to provide the above data signals to a data line. The sensing circuit 16 is connected to each sensing signal line. The processor 11 is also connected to the sensing circuit 16, so that the sensing circuit 16 can perform the above operation of sensing pixel internal data of a line of pixel units or a full screen of pixel units under the control of the processor 11, and can transmit the sensed data (e.g., a one-line sensing data OLSD obtained by sensing a line of pixel units or frame sensing data FSD obtained by the full-screen sensing process) to the processor 11 via a connecting line. In some examples, the sensing circuit 16 includes an analog-to-digital converter configured to convert a sensing signal on the sensing signal line into a one-line sensing data OLSD or frame sensing data FSD. It should be understood that the functions and structures of the above components in practical applications are not limited to the content described above.

Figure 4:
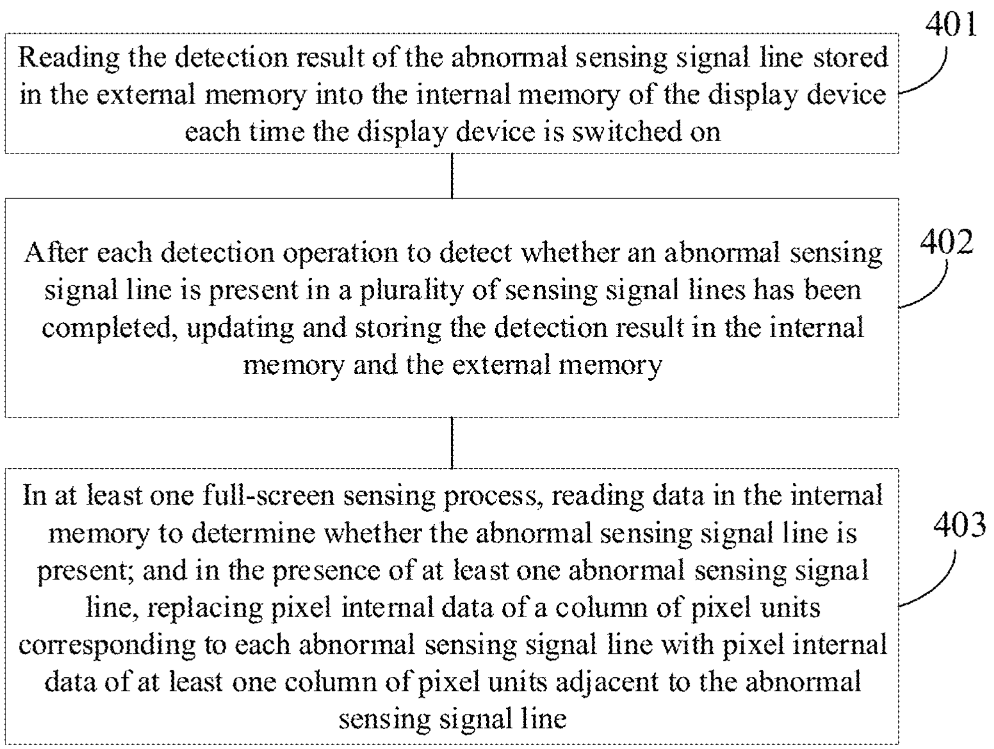
FIG. 4 is a flowchart of a method for sensing pixel internal data in a display device according to some embodiments of the present disclosure.

FIG. 4 is a schematic diagram of a flowchart of a method for sensing pixel internal data according to some embodiments of the present disclosure. The method shown in FIG. 4 realizes the detection and shielding of a fault column (abnormal sensing signal line) in a display device based on the display device shown in FIG. 3. Referring to FIG. 4, the method includes the following steps.

In step 401, the detection result of the abnormal sensing signal line stored in the external memory is read into the internal memory of the display device each time the display device is switched on.

Taking the structure shown in FIG. 3 as an example, based on an instruction, a program or a code set stored in the external memory 13, the operations automatically performed by the processor 11 of the display device in the case of being switched on includes: reading detection result data stored in a specified location of the external memory 13, and caching the data to the internal memory 12 for use before the display device is switched off. In one example, the detection result data is a string of data consisting of 0 and 1, each 0 representing the detection result of the sensing signal line connected to a column of pixel units being normal, each 1 representing the detection result of the sensing signal line connected to a column of pixel units being abnormal (that is, the above abnormal sensing signal line). For example, "00000" represents the detection results of the sensing signal lines connected to five columns of pixel units being all normal, "00100" represents the detection results of the sensing signal line connected to the third column of pixel units being all abnormal, and the sensing signal lines connected to the other columns being normal.

In step 402, after each detection operation to detect whether an abnormal sensing signal line is present in a plurality of sensing signal lines has been completed, the detection result is updated and stored in the internal memory and the external memory.

Based on an instruction, a program, or a code set stored in the external memory 13, the processor 11 of the display device can start to perform the detection operation to detect whether an abnormal sensing signal line is present in the sensing signal lines as triggered by a user instruction, a timer or other trigger conditions; and after the detection operation has been completed, the detection result is updated and stored in the internal memory 12 and the external memory 13. The specific execution method of the detection operation may refer to the examples described previously or later, and is not repeated here.

In step 403, in at least one full-screen sensing process, data in the internal memory is read to determine whether the abnormal sensing signal line is present; and in the presence of at least one abnormal sensing signal line, pixel internal data of a column of pixel units corresponding to each abnormal sensing signal line is replaced with pixel internal data of at least one column of pixel units adjacent to the abnormal sensing signal line.

Based on the instruction, program or code set stored in the external memory 13, the processor 11 of the display device can periodically perform an operation corresponding to the above full-screen sensing process in a plurality of consecutive display cycles (e.g., threshold voltage data of the pixel internal data is subjected to once full-screen sensing within a fixed period of time in each display frame), to acquire the pixel internal data of each pixel unit connected to the sensing signal line, thereby achieving the functions such as temperature compensation, ambient light compensation, pressure sensing, and threshold voltage compensation. In this process, based on the instruction, program, or code set stored in the external memory 13, the processor 11, in response to determining the presence of at least one abnormal sensing signal line based on the detection results stored in the internal memory 12, performs a shielding operation for the abnormal sensing signal line. In one example, the processor 11 directly replaces pixel internal data of pixel units of a fault column with pixel internal data of a column of pixel units on the left side (i.e., when a column sequence number Lx of the fault column is greater than 1, pixel internal data of a pixel unit with a column sequence number $Lx-1$ is used for replacement, while when the fault column sequence number Lx is 1, pixel internal data of a pixel unit with a column sequence number of 2 is used for replacement). In yet another example, the processor 11 replaces pixel internal data of pixel units of a fault column with an average value of pixel internal data of pixel units of the left column and of pixel internal data of pixel units of the right column (i.e., except for the first column and the last column, pixel internal data of pixel units with a column sequence number Lx is replaced with an average value of pixel internal data of a pixel unit with a column sequence number of $Lx-1$ and of pixel internal data of a pixel unit with a column sequence number of Lx+1). It should be understood that the above examples are a possible implementation of step 103 described above. It can be seen that the mode of directly replacing with another column is faster in processing speed, while the mode of averaging can get more reliable replacement results.

Further, unlike the example of FIG. 4, in other examples, the display device detects whether the abnormal sensing signal line is present in the plurality of sensing signal lines while being switched on each time, and stores the detection results in the internal memory for use in at least one full-screen sensing process. That is, the display device does not store the detection results in the external memory 13, but uses a mode of detection once each time it is switched on, to ensure that the internal memory 12 has the detection results required for the full-screen sensing process. It can be seen that in contrast, these examples can save storage resources in the external memory 13, while the example of FIG. 4 does not need to perform detection once each time it is switched on, thereby saving the time of power-on and improving the stability of program execution.

Figure 5:
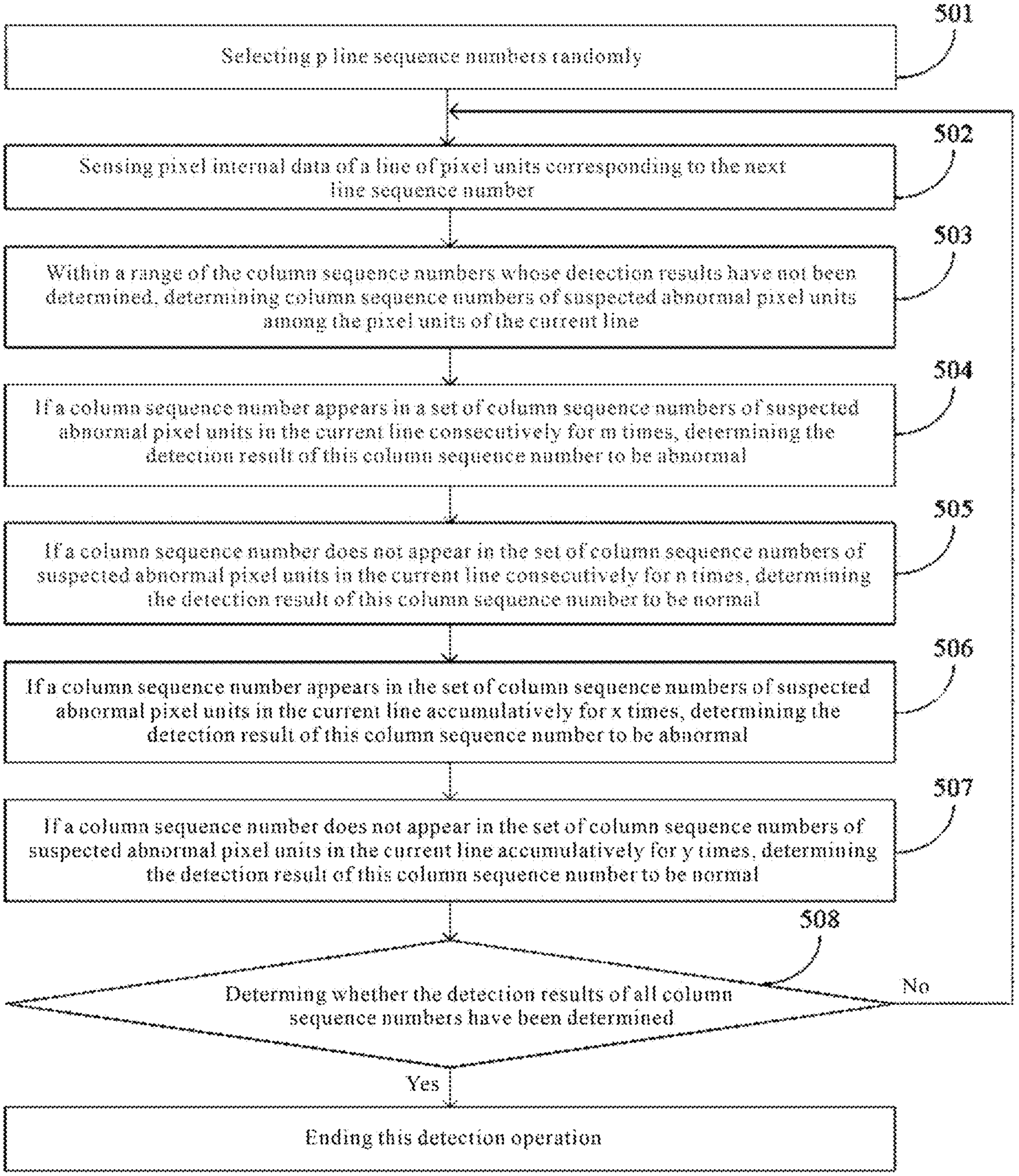
FIG. 5 is a flowchart in one detection operation in a method for sensing pixel internal data in a display device according to some embodiments of the present disclosure.

FIG. 5 is a schematic diagram of a flowchart of a detection operation in a method for sensing pixel internal data in a display device according to some embodiments of the present disclosure. Referring to FIG. 5, each detection operation in this method includes the following step processes.

In step 501, p line sequence numbers are randomly selected.

In one example, for an 8K display device (with a resolution of 4320*7680), step 501 includes: randomly selecting p line sequence numbers from a range of 1 to 7680 (p is a preset parameter and is an integer not less than 3) for detecting whether a sensing signal line corresponding to each column sequence number is an abnormal sensing signal line. Compared with such fixed and equidistant selection method in which line sequence numbers equal to ⅛, ⅜, ⅝, and ⅞ of the total number of lines are, for example, selected, the random selection can avoid the adverse effects of accidental factors on the accuracy of the detection results, and also avoid a situation that the fault of the second gate line in the fixed selected pixel line causes the detection operation to not be carried out normally.

In step 502, pixel internal data of a line of pixel units corresponding to the next line sequence number is sensed.

As shown in FIG. 5, the mode of sensing the pixel internal data of p lines of pixel units line by line is adopted in this method, that is, the operation for the next line is continued in response to not meeting a termination condition after the operation for the previous line has been completed. In one example, when the step 502 is performed for the first time, the processor 11 first determines a first line sequence number in the p line sequence numbers, and controls the gate driver 14 by a control signal to provide a sensing switching signal to the second gate line corresponding to this line sequence number, so that the pixel units Px in this line perform the operation of sensing the pixel internal data to generate sensing signals and output the sensing signals to the sensing circuit 16 through the respective sensing signal lines connected thereto. Therefore, the processor 11 acquires the pixel internal data of the pixel units Px in this line via the sensing circuit 16.

In step 503, within a range of the column sequence numbers whose detection results are not determined, column sequence numbers of suspected abnormal pixel units among the pixel units of the current line is determined.

In one example, the processor 11 creates a data table or array in the internal memory 12, for recording whether the detection result of each column sequence number has been determined. In the initial state, the detection result of each column sequence number is not determined, so the processor 11 performs a process of determining whether the pixel internal data acquired in step the 502 meets the above abnormality determination condition in step 503, to determine the column sequence numbers of the suspected abnormal pixel units among the pixel units of the current line. In the case that the detection results of some column sequence numbers have been determined, the processor 11 skips the judgment of whether the pixel internal data corresponding to these column sequence numbers meet the above abnormality determination condition, thereby saving the processing time and computing resources.

In step 504, if a column sequence number appears in a set of column sequence numbers of suspected abnormal pixel units in the current line consecutively for m times, the detection result of this column sequence number is determined to be abnormal.

m is a preset parameter and is an integer not less than 2. In order to avoid excessive occupancy of system resources caused by too slow detection operation processing speed when the number of selected p lines is too large, the method shown in FIG. 5 provides four conditions involving early termination of the detection operation, respectively corresponding to steps 504, 505, 506 and 507. In one example, when a column sequence number appears in the cycle of steps 502 to 508 consecutively for m times in the column sequence numbers of the suspected abnormal pixel units determined in the step 503, the processor 11 records in the data table or array in the internal memory 12 that the detection result corresponding to this column sequence number has been determined to be "abnormal". That is, it is unnecessary to wait for the detection result of this column sequence number in each next line of pixel units, but the sensing signal line corresponding to this column sequence number is determined in advance as an abnormal sensing signal line, without performing a separate operation to determine whether the sensing signal line corresponding to this column sequence number is the abnormal sensing signal line.

In step 505, if a column sequence number does not appear in a set of column sequence numbers of suspected abnormal pixel units in the current line consecutively for n times, the detection result of this column sequence number is determined to be normal.

n is a preset parameter and is an integer not less than 3. In one example, when a column sequence number does not appear in the cycle of steps 502 to 508 consecutively for n times in the column sequence numbers of the suspected abnormal pixel units determined in the step 503, the processor 11 records in the data table or array in the internal memory 12 in the current step 505 that the detection result corresponding to this column sequence number has been determined to be "normal". That is, it is unnecessary to wait for the detection result of this column sequence number in each next line of pixel units, but the sensing signal line corresponding to this column sequence number is determined in advance to be not an abnormal sensing signal line, without performing the separate operation to determine whether the sensing signal line corresponding to this column sequence number is the abnormal sensing signal line.

In 506, if a column sequence number appears in a set of column sequence numbers of suspected abnormal pixel units in the current line accumulatively for x times, the detection result of this column sequence number is determined to be abnormal.

x is a preset parameter and is an integer not less than 2. In one example, when a column sequence number appears in the cycle of steps 502 to 508 accumulatively for x times in the column sequence numbers of the suspected abnormal pixel units determined in the step 503, the processor 11 records in the data table or array in the internal memory 12 in the current step 506 that the detection result corresponding to this column sequence number has been determined to be "abnormal". That is, it is unnecessary to wait for the detection result of this column sequence number of each next line of pixel units, but the sensing signal line corresponding to this column sequence number is determined in advance as the abnormal sensing signal line, without performing the separate operation to determine whether the sensing signal line corresponding to the column sequence number is the abnormal sensing signal line.

In 507, if a column sequence number does not appear in a set of column sequence numbers of suspected abnormal pixel units in the current line accumulatively for y times, the detection result of this column sequence number is determined to be normal.

The y is equal to p minus the x plus 1. In one example, when a column sequence number does not appear in the cycle of steps 502 to 508 accumulatively for y times in the column sequence numbers of the suspected abnormal pixel units determined in the step 503, the processor 11 records in the data table or array in the internal memory 12 in the current step 506 that the detection result corresponding to this column sequence number has been determined to be "normal". That is, it is unnecessary to wait for the detection result of this column sequence number in each next line of pixel units, but the sensing signal line corresponding to this column sequence number is determined in advance not to be the abnormal sensing signal line, without performing the separate operation to determine whether the sensing signal line corresponding to the column sequence number is the abnormal sensing signal line.

In 508, if the detection results of all column sequence numbers have been determined, this detection operation is ended; otherwise, the process returns to the step 502 for proceeding.

In one example, the processor 11 checks in the step 508 whether there is a column sequence number whose detection result has not been determined according to the data table or array in the internal memory 12; if the column sequence number is present, the process returns to the step 502 to continue the operation corresponding to the next line sequence number; and if the column sequence number is absent, it means that the detection results of all column sequence numbers have been determined, without performing operations corresponding to other line sequence numbers, so this detection operation is ended. In addition, the detection results of this detection operation are generated based on the data table or array in the internal memory 12 to be updated and stored in the external memory 13 and the internal memory 12.

Figure 6:
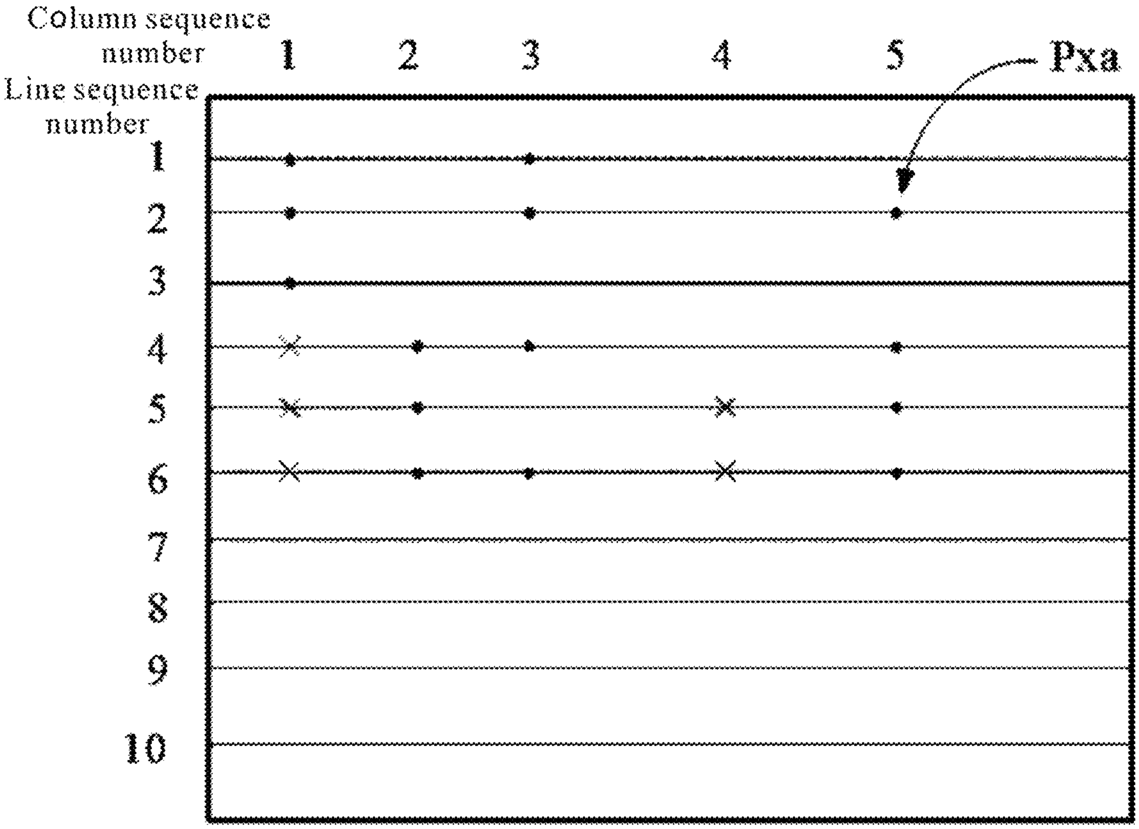
FIG. 6 is a schematic diagram of a detection process in the flowchart shown in FIG. 5.

FIG. 6 is a schematic diagram of a detection process in the step processes shown in FIG. 5. In this example, p=10, m=3, n=4, x=4, y=7, and for brevity, the above p line sequence numbers are 1 to 10, and the number of the sensing signal lines is 5 corresponding to column sequence numbers 1 to 5. Referring to FIG. 6, in the process of performing a loop body of the steps 502 to 508 for the first time, the pixel units with column sequence numbers of 1 and 3 among pixel units with the line sequence number of 1 are determined as suspected abnormal pixel units Pxa through the judgment of the abnormality determination condition, but no column sequence number meets the determination conditions in steps 504 to 507, so the step 508 determines that there is still a column sequence number whose detection result has not been determined and starts the second cycle before returning to the step 502. As shown in FIG. 6, in the second cycle, the pixel units with column sequence numbers of 1, 3, and 5 among pixel units with the line sequence number of 2 are determined as suspected abnormal pixel units Pxa through the judgment of the abnormality determination condition, but no column sequence number meets the determination conditions in the steps 504 to 507, so the step 508 determines that there is still a column sequence number whose detection result has not been determined and starts the third cycle before returning to the step 502. As shown in FIG. 6, in the third cycle, the pixel unit with the column sequence number of 1 among the pixel units with the line sequence number of 3 is determined as a suspected abnormal pixel unit Pxa through the judgment of the abnormality determination condition, so that the column sequence number of 1 meets the determination condition in the step 504, and whereby the column sequence number of 1 is recorded as the determined detection result being "abnormal". In addition, in the subsequent cycle, no separate operation or processing is performed for the column sequence number of 1 (e.g., no longer receiving the pixel internal data for this column sequence number or no longer processing the received pixel internal data, indicated by a mark "x" in FIG. 6), and the step 508 determines that there is still a column sequence number whose detection result has not been determined and starts the fourth cycle before returning to the step 502. As shown in FIG. 6, in the fourth cycle, the pixel units with column sequence numbers of 2, 3, and 5 among pixel units with the line sequence number of 4 are determined as suspected abnormal pixel units Pxa through the judgment of the abnormality determination condition, and whereby the column sequence number of 4 meets the determination condition in the step 505, so the column sequence number of 4 is recorded as the determined detection result being "normal", and the step 508 determines that there is still a column sequence number whose detection result has not been determined and starts the fifth cycle before returning to the step 502. As shown in FIG. 6, in the fifth cycle, the pixel units with column sequence numbers of 2 and 5 among pixel units with the line sequence number of 5 are determined as suspected abnormal pixel units Pxa through the judgment of the abnormality determination condition, but none of the remaining column sequence numbers of 2, 3 and 5 meets the determination conditions in the steps 504 to 507, so the step 508 determines that there is still a column sequence number whose detection result has not been determined and starts the sixth cycle before returning to the step 502. In the sixth cycle, the pixel units with column sequence numbers of 2, 3, and 5 among pixel units with the line sequence number of 6 are determined as suspected abnormal pixel units Pxa through the judgment of the abnormality determination condition, such that the column sequence numbers of 2 and 5 both meet the determination condition in the step 504, so the detection result thereof is determined to be "abnormal". Meanwhile, the column sequence number of 3 meets the determination condition in the step 506, so the detection result thereof is determined to be "abnormal". Therefore, it is determined in the step 508 that a column sequence number whose detection result has not been determined is absent, so this detection operation is ended, without performing operations corresponding to the pixel units of the line sequence numbers of 7 to 10. In addition, the detection results of this detection operation (the column sequence numbers of 1, 2, 3, and 5 are abnormal, and the column sequence number of 4 is normal) are finally outputted.

It can be seen that, by setting the determination conditions in the steps 504 to 507 above, the detection operation facilitates reducing the number of line sequence numbers that need to be traversed when the number p of lines is large, thereby reducing the time required for the detection operation and the resources to be occupied, and improving the processing efficiency. In other examples, one or more of the above steps 504 to 507 may be removed as needed, and a similar step corresponding to a determination condition may also be added as needed. In addition, considering the validity of determination, in other examples, the step 504 is performed only when the number of cycles is not less than m−1, the step 505 is performed only when the number of cycles is not less than n−1, the step 506 is performed only when the number of cycles is not less than x−1, and the step 507 is performed only when the number of cycles is not less than y−1. In this way, the number of invalid determinations can be reduced to facilitate improving the processing efficiency.

The following are apparatus embodiments of the present disclosure, which are configured to implement the method embodiments of the present disclosure. For details that are not disclosed in the apparatus embodiments of the present disclosure, please refer to the method embodiments of the present disclosure.

Figure 7:
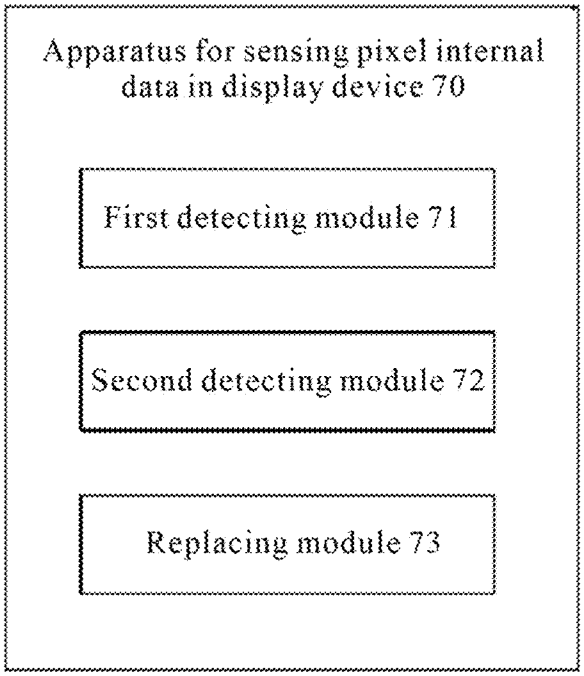
FIG. 7 is a structural block diagram of an apparatus for sensing pixel internal data in a display device according to some embodiments of the present disclosure.

FIG. 7 is a structural block diagram of an apparatus for sensing pixel internal data in a display device according to some embodiments of the present disclosure. Referring to FIG. 7, the apparatus includes:

- a first detecting module 71, configured to sense pixel internal data for each line of pixel units to determine column sequence numbers of suspected abnormal pixel units in the line of pixel units, the suspected abnormal pixel units being pixel units in which the pixel internal data as sensed meets an abnormality determination condition;
- a second detecting module 72, configured to determine, based on a number of the suspected abnormal pixel units of each column sequence number in the at least three lines of pixel units, whether a sensing signal line corresponding to the column sequence number is an abnormal sensing signal line; and
- a replacing module 73, configured to, in a case that there is at least one abnormal sensing signal line, replace pixel internal data of a column of pixel units corresponding to each abnormal sensing signal line with pixel internal data of at least one column of pixel units adjacent to the abnormal sensing signal line during at least one full-screen sensing process.

It can be seen from the embodiments of the present disclosure that, by sensing the pixel internal data for a few lines of pixel units, the suspected abnormal pixel unit in which the pixel internal data meets the abnormality determination condition is determined. Based on the number of suspected abnormal pixel units in the same column, whether a fault has occurred to cause the entire column of pixel units to output abnormal pixel internal data is determined. In the case that the fault has occurred, the sensing signal line of the fault column is determined as the abnormal sensing signal line, and the pixel internal data of the pixel unit in the fault column is replaced by the pixel internal data of the adjacent column of pixel units each time all pixel units are sensed. That is, the fault column is detected and shielded in the display device, which can facilitate mitigating or eliminating the undesirable phenomenon caused by the abnormal pixel internal data outputted from the entire column when the fault occurs, and also facilitate improving the performance and reliability of the display device.

In some embodiments, the replacing module 73 is, when there is at least one abnormal sensing signal line, during an odd-numbered full-screen sensing, replace the pixel internal data of the column of pixel units corresponding to each abnormal sensing signal line with pixel internal data of a column of pixel units on a left side of the abnormal sensing signal line; and during an even-numbered full-screen sensing, replace the pixel internal data of the column of pixel units corresponding to each abnormal sensing signal line with pixel internal data of a column of pixel units on a right side of the abnormal sensing signal line; or

- during an odd-numbered full-screen sensing, replace the pixel internal data of the column of pixel units corresponding to each abnormal sensing signal line with pixel internal data of a column of pixel units on a right side of the abnormal sensing signal line; and during an even-numbered full-screen sensing, replace the pixel internal data of the column of pixel units corresponding to each abnormal sensing signal line with pixel internal data of a column of pixel units on a left side of the abnormal sensing signal line.

In some embodiments, the replacing module is, when there is at least one abnormal sensing signal line, further configured to:

- during an odd-numbered full-screen sensing, replace the pixel internal data of the column of pixel units corresponding to each abnormal sensing signal line with pixel internal data of a column of pixel units on a right side of the abnormal sensing signal line; and during an even-numbered full-screen sensing, replace the pixel internal data of the column of pixel units corresponding to each abnormal sensing signal line with an average value of pixel internal data of a column of pixel units on a left side of the abnormal sensing signal line and pixel internal data of a column of pixel units on the right side of the abnormal sensing signal line; or
- during an odd-numbered full-screen sensing, replace the pixel internal data of the column of pixel units corresponding to each abnormal sensing signal line with an average value of pixel internal data of a column of pixel units on a left side of the abnormal sensing signal line and pixel internal data of a column of pixel units on a right side of the abnormal sensing signal line; and during an even-numbered full-screen sensing, replace the pixel internal data of the column of pixel units corresponding to each abnormal sensing signal line with the pixel internal data of the column of pixel units on the right side of the abnormal sensing signal line.

In some embodiments, the apparatus further includes a selecting module (not shown in FIG. 7), which is configured to, prior to sensing the pixel internal data for each line of pixel units, select at least three line sequence numbers randomly or equidistantly to determine multiple lines of pixel units corresponding to the at least three line sequence numbers as the at least three lines of pixel units in which the pixel internal data is to be sensed.

In some embodiments, the second detecting module 72 is further configured to:

- in a process of sensing the pixel internal data of the at least three lines of pixel units line by line to determine the column sequence numbers of the suspected abnormal pixel units in each line, in a case that any of the column sequence numbers appears consecutively for m times among consecutive m lines, determining the sensing signal line corresponding to the column sequence number as the abnormal sensing signal line, and no longer performing a separate operation to determine whether the sensing signal line corresponding to the column sequence number is the abnormal sensing signal line;

in the process of sensing the pixel internal data of the at least three lines of pixel units line by line to determine the column sequence numbers of the suspected abnormal pixel units in each line, in a case that any of the column sequence numbers does not appear consecutively for n times among consecutive n lines, determining the sensing signal line corresponding to the column sequence number as a normal sensing signal line, and no longer performing the separate operation to determine whether the sensing signal line corresponding to the column sequence number is the abnormal sensing signal line; and in the process of sensing the pixel internal data of the at least three lines of pixel units line by line to determine the column sequence numbers of the suspected abnormal pixel units in each line, in a case that a result indicating whether each of the sensing signal lines is the abnormal sensing signal line has been determined, stopping the sensing of the pixel internal data of the at least three lines of pixel units line by line, wherein the m is an integer not less than 2, the n is an integer not less than 3.

In some embodiments, the second detecting module 72 is further configured to:

in the process of sensing the pixel internal data of the at least three lines of pixel units line by line to determine the column sequence numbers of the suspected abnormal pixel units in each line, in a case that any of the column sequence numbers appears for x times among different lines, determining the sensing signal line corresponding to the column sequence number as the abnormal sensing signal line, and no longer performing the separate operation to determine whether the sensing signal line corresponding to the column sequence number is the abnormal sensing signal line; and in the process of sensing the pixel internal data of the at least three lines of pixel units line by line to determine the column sequence numbers of the suspected abnormal pixel units in each line, in the case that any of the column sequence numbers does not appear for y times among different lines, determining the sensing signal line corresponding to the column sequence number as the normal sensing signal line, and no longer performing the separate operation to determine whether the sensing signal line corresponding to the column sequence number is the abnormal sensing signal line, wherein the x is an integer not less than 2, and the y is equal to a number of lines of at least three lines of pixel units minus the x plus 1.

In some embodiments, the apparatus further includes an initializing module (not shown in FIG. 7), which is configured to: each time the display device is switched on, detect whether the abnormal sensing signal line is present in the plurality of sensing signal lines, and store a detection result in the internal memory for use in the at least one full-screen sensing process; or update and store in the external memory the detection result each time whether the abnormal sensing signal line is present in the plurality of sensing signal lines is detected, and read the detection result stored in the external memory into the internal memory each time the display device is switched on, for use in the at least one full-screen sensing process.

In some embodiments, the abnormality determination condition includes at least one of the following conditions:

a value of the pixel internal data of the pixel unit is greater than a set upper limit value;

the value of the pixel internal data of the pixel unit is less than a set lower limit value;

the value of the pixel internal data of the pixel unit exceeds a set value range;

a difference between the value of the pixel internal data of the pixel unit and a value of pixel internal data of a column of pixel units previous to the current column is greater than a set value;

a difference between the value of the pixel internal data of the pixel unit and a value of pixel internal data of a column of pixel units next to the current column is greater than a set value; and a difference between the value of the pixel internal data of the pixel unit and a value of history pixel internal data of the pixel unit is greater than a set value.

In some embodiments, the number of the suspected abnormal pixel units of a column sequence number corresponding to the abnormal sensing signal line among at least three lines of pixel units is not less than 2.

In some embodiments, the first detecting module 71 is disposed in the sensing circuit 16, or integrated in the source driver 15; and the replacing module 73 is integrated in the processor 11. The initializing module and the selecting module (not shown) are arranged in the sensing circuit 16, or integrated in the source driver 15 or processor 11.

Some embodiments of the present disclosure further provide a non-transitory computer storage medium, the non-transitory computer storage medium being configured to store at least one instruction, at least one program, a code set or an instruction set therein, wherein the at least one instruction, the at least one program, the code set or the instruction set, when loaded and executed by a processor, causes the processor to perform any of the above methods for sensing the pixel internal data in the display device. The external memory 13 is used as an example of a non-transitory computer storage medium in the embodiments of the present disclosure.

In the present disclosure, the terms “first” and “second” are used for descriptive purposes only and are not to be construed as indicating or implying relative importance. The term “a plurality of” refers to two or more, unless specifically defined otherwise.

In several embodiments provided in the present disclosure, it should be understood that the disclosed apparatus and method may be implemented by other ways. For example, the apparatus embodiments described above are merely schematic. For example, the partitioning of the units can be a logical functional partitioning. There may be other partitioning modes during actual implementation. For example, multiple units or components can be combined or integrated into another system, or some features can be ignored or not executed. In addition, mutual coupling or direct coupling or communication connection that is shown or discussed can be indirect coupling or communication connection through some interfaces, apparatuses or units, and can be in electrical, mechanical or other forms.

The units described as separate components may or may not be physically separated, and the components for unit description may or may not be physical units, that is, may be located in one place or distributed on a plurality of network units. Part or all of the units can be selected according to actual needs to achieve the objects of the solutions of the embodiments.

It may be understood by a person of ordinary skill in the art that all or part of steps in the above embodiments may be completed by hardware, or a program instructing relevant hardware. The program may be stored in a computer-readable storage medium which includes a read-only memory, a magnetic disk, an optical disc or the like.

The foregoing descriptions are merely optional embodiments of the present disclosure, and are not intended to limit the present disclosure. Within the spirit and principles of the present disclosure, any modifications, equivalent substitutions, improvements, etc., are within the protection scope of the present disclosure.

What is claimed is:

1. A method for sensing pixel internal data in a display device, the display device comprising a plurality of pixel units and a plurality of sensing signal lines, the plurality of pixel units being arranged in multiple lines and multiple columns, and the sensing signal lines having a one-to-one correspondence with columns of the plurality of pixel units; wherein the method comprises:

sensing the pixel internal data for each of at least three lines of pixel units to determine column sequence numbers of suspected abnormal pixel units in the line of pixel units, the suspected abnormal pixel units being pixel units in which the pixel internal data as sensed meets an abnormality determination condition;

determining, based on a number of the suspected abnormal pixel units of each column sequence number in the at least three lines of pixel units, whether a sensing signal line corresponding to the column sequence number is an abnormal sensing signal line; and in response to detecting at least one abnormal sensing signal line, replacing pixel internal data of a column of pixel units corresponding to each abnormal sensing signal line with pixel internal data of at least one column of pixel units directly adjacent to the abnormal sensing signal line during at least one full-screen sensing process;

wherein the determining, based on the number of the suspected abnormal pixel units of each column sequence number in the at least three lines of pixel units, whether the sensing signal line corresponding to the column sequence number is the abnormal sensing signal line comprises:

in a process of sensing the pixel internal data of the at least three lines of pixel units line by line to determine the column sequence numbers of the suspected abnormal pixel units in each line, in response to any of the column sequence numbers appearing consecutively for m times among consecutive m lines, determining the sensing signal line corresponding to the column sequence number as the abnormal sensing signal line, and no longer performing a separate operation to determine whether the sensing signal line corresponding to the column sequence number is the abnormal sensing signal line;

in the process of sensing the pixel internal data of the at least three lines of pixel units line by line to determine the column sequence numbers of the suspected abnormal pixel units in each line, in response to any of the column sequence numbers not appearing consecutively for n times among consecutive n lines, determining the sensing signal line corresponding to the column sequence number as a normal sensing signal line, and no longer performing the separate operation to determine whether the sensing signal line corresponding to the column sequence number is the abnormal sensing signal line; and in the process of sensing the pixel internal data of the at least three lines of pixel units line by line to determine the column sequence numbers of the suspected abnormal pixel units in each line, in response to a result indicating whether each of the sensing signal lines is the abnormal sensing signal line having been determined, stopping the sensing of the pixel internal data of the at least three lines of pixel units line by line, wherein the m being an integer not less than 2, the n being an integer not less than 3;

wherein the abnormality determination condition includes at least one of following conditions:

a value of the pixel internal data of the pixel unit is greater than a set upper limit value;

the value of the pixel internal data of the pixel unit is less than a set lower limit value;

the value of the pixel internal data of the pixel unit exceeds a set value range;

a difference between the value of the pixel internal data of the pixel unit and a value of pixel internal data of a column of pixel units previous to a current column is greater than a set value;

a difference between the value of the pixel internal data of the pixel unit and a value of pixel internal data of a column of pixel units next to the current column is greater than a set value; or a difference between the value of the pixel internal data of the pixel unit and a value of history pixel internal data of the pixel unit is greater than a set value.

2. The method according to claim 1, prior to sensing the pixel internal data for each line of pixel units, the method further comprising:

selecting at least three line sequence numbers randomly or equidistantly to determine multiple lines of pixel units corresponding to the at least three line sequence numbers as the at least three lines of pixel units in which the pixel internal data is to be sensed.

3. The method according to claim 1, wherein the determining, based on the number of the suspected abnormal pixel units of each column sequence number in the at least three lines of pixel units, whether the sensing signal line corresponding to the column sequence number is the abnormal sensing signal line further comprises:

in the process of sensing the pixel internal data of the at least three lines of pixel units line by line to determine the column sequence numbers of the suspected abnormal pixel units in each line, in response to any of the column sequence numbers appearing for x times among different lines, determining the sensing signal line corresponding to the column sequence number as the abnormal sensing signal line, and no longer performing the separate operation to determine whether the sensing signal line corresponding to the column sequence number is the abnormal sensing signal line; and in the process of sensing the pixel internal data of the at least three lines of pixel units line by line to determine the column sequence numbers of the suspected abnormal pixel units in each line, in response to any of the column sequence numbers not appearing for y times among different lines, determining the sensing signal line corresponding to the column sequence number as the normal sensing signal line, and no longer performing the separate operation to determine whether the sensing signal line corresponding to the column sequence number is the abnormal sensing signal line, wherein the x is an integer not less than 2, and the y is equal to a number of lines of at least three lines of pixel units minus the x plus 1.

4. The method according to claim 1, wherein the display device further comprises an internal memory and an external memory, and the method further comprises:

each time the display device is switched on, detecting whether the abnormal sensing signal line is present in the plurality of sensing signal lines, and storing a detection result in the internal memory for use in the at least one full-screen sensing process;

or updating and storing in the external memory the detection result each time whether the abnormal sensing signal line is present in the plurality of sensing signal lines is detected, and reading the detection result stored in the external memory into the internal memory each time the display device is switched on, for use in the at least one full-screen sensing process.

5. The method according to claim 1, wherein the number of the suspected abnormal pixel units of a column sequence number corresponding to the abnormal sensing signal line among at least three lines of pixel units is not less than 2.

6. The method according to claim 1, wherein the pixel internal data comprises at least one of temperature, pressure, voltage, current, and light intensity.

7. The method according to claim 6, wherein the pixel internal data comprises data of a threshold voltage of a transistor inside the pixel unit.

8. The method according to claim 1, wherein the abnormality determination condition for the suspected abnormal pixel unit comprises: a difference between a value of pixel internal data of a current pixel unit and a value of pixel internal data of a pixel unit in a column previous to the current pixel unit is greater than an upper limit value, and a difference between the value of the pixel internal data of the current pixel unit and a value of pixel internal data of a pixel unit in a column next to the current pixel unit is greater than the upper limit value, the upper limit value being equal to one-fourth of a theoretical maximum value of the pixel internal data, the theoretical maximum value of the pixel internal data is a threshold voltage of a transistor inside the pixel unit.

9. The method according to claim 1, wherein the replacing the pixel internal data of the column of pixel units corresponding to each abnormal sensing signal line with the pixel internal data of at least one column of pixel units adjacent to the abnormal sensing signal line during the at least one full-screen sensing process comprises:

during an odd-numbered full-screen sensing, replacing the pixel internal data of the column of pixel units corresponding to each abnormal sensing signal line with pixel internal data of a column of pixel units on a left side of the abnormal sensing signal line; and during an even-numbered full-screen sensing, replacing the pixel internal data of the column of pixel units corresponding to each abnormal sensing signal line with pixel internal data of a column of pixel units on a right side of the abnormal sensing signal line;

or during an odd-numbered full-screen sensing, replacing the pixel internal data of the column of pixel units corresponding to each abnormal sensing signal line with pixel internal data of a column of pixel units on a right side of the abnormal sensing signal line; and during an even-numbered full-screen sensing, replacing the pixel internal data of the column of pixel units corresponding to each abnormal sensing signal line with pixel internal data of a column of pixel units on a left side of the abnormal sensing signal line.

10. The method according to claim 1, wherein the replacing the pixel internal data of the column of pixel units corresponding to each abnormal sensing signal line with the pixel internal data of at least one column of pixel units adjacent to the abnormal sensing signal line during the at least one full-screen sensing process comprises:

during an odd-numbered full-screen sensing, replacing the pixel internal data of the column of pixel units corresponding to each abnormal sensing signal line with pixel internal data of a column of pixel units on a right side of the abnormal sensing signal line; and during an even-numbered full-screen sensing, replacing the pixel internal data of the column of pixel units corresponding to each abnormal sensing signal line with an average value of pixel internal data of a column of pixel units on a left side of the abnormal sensing signal line and the pixel internal data of the column of pixel units on the right side of the abnormal sensing signal line;

or during an odd-numbered full-screen sensing, replacing the pixel internal data of the column of pixel units corresponding to each abnormal sensing signal line with an average value of pixel internal data of a column of pixel units on a left side of the abnormal sensing signal line and pixel internal data of a column of pixel units on a right side of the abnormal sensing signal line; and during an even-numbered full-screen sensing, replacing the pixel internal data of the column of pixel units corresponding to each abnormal sensing signal line with the pixel internal data of the column of pixel units on the right side of the abnormal sensing signal line.

11. A display device, comprising a processor, a memory, a plurality of pixel units and a plurality of sensing signal lines, the plurality of pixel units being arranged in multiple lines and multiple columns, and the sensing signal lines having a one-to-one correspondence with columns of the plurality of pixel units; wherein the memory is configured to store at least one instruction, at least one program, a code set, or an instruction set therein, and the at least one instruction, the at least one program, the code set or the instruction set, when loaded and executed by the processor, causes the processor to perform:

sensing pixel internal data for each of at least three lines of pixel units to determine column sequence numbers of suspected abnormal pixel units in the line of pixel units, the suspected abnormal pixel units being pixel units in which the pixel internal data as sensed meets an abnormality determination condition;

determining, based on a number of the suspected abnormal pixel units of each column sequence number in the at least three lines of pixel units, whether a sensing signal line corresponding to the column sequence number is an abnormal sensing signal line; and in response to detecting at least one abnormal sensing signal line, replacing pixel internal data of a column of pixel units corresponding to each abnormal sensing signal line with pixel internal data of at least one column of pixel units directly adjacent to the abnormal sensing signal line during at least one full-screen sensing process;

wherein the determining, based on the number of the suspected abnormal pixel units of each column sequence number in the at least three lines of pixel units, whether the sensing signal line corresponding to the column sequence number is the abnormal sensing signal line comprises:

in a process of sensing the pixel internal data of the at least three lines of pixel units line by line to determine the column sequence numbers of the suspected abnormal pixel units in each line, in response to any of the column sequence numbers appearing consecutively for m times among consecutive m lines, determining the sensing signal line corresponding to the column sequence number as the abnormal sensing signal line, and no longer performing a separate operation to determine whether the sensing signal line corresponding to the column sequence number is the abnormal sensing signal line;

in the process of sensing the pixel internal data of the at least three lines of pixel units line by line to determine the column sequence numbers of the suspected abnormal pixel units in each line, in response to any of the column sequence numbers not appearing consecutively for n times among consecutive n lines, determining the sensing signal line corresponding to the column sequence number as a normal sensing signal line, and no longer performing the separate operation to determine whether the sensing signal line corresponding to the column sequence number is the abnormal sensing signal line; and in the process of sensing the pixel internal data of the at least three lines of pixel units line by line to determine the column sequence numbers of the suspected abnormal pixel units in each line, in response to a result indicating whether each of the sensing signal lines is the abnormal sensing signal line having been determined, stopping the sensing of the pixel internal data of the at least three lines of pixel units line by line, wherein the m being an integer not less than 2, the n being an integer not less than 3;

wherein the abnormality determination condition includes at least one of following conditions:

a value of the pixel internal data of the pixel unit is greater than a set upper limit value;

the value of the pixel internal data of the pixel unit is less than a set lower limit value;

the value of the pixel internal data of the pixel unit exceeds a set value range;

a difference between the value of the pixel internal data of the pixel unit and a value of pixel internal data of a column of pixel units previous to a current column is greater than a set value;

a difference between the value of the pixel internal data of the pixel unit and a value of pixel internal data of a column of pixel units next to the current column is greater than a set value; or a difference between the value of the pixel internal data of the pixel unit and a value of history pixel internal data of the pixel unit is greater than a set value.

12. The display device according to claim 11, wherein the at least one instruction, the at least one program, the code set or the instruction set, when loaded and executed by the processor, causes the processor to perform:

selecting at least three line sequence numbers randomly or equidistantly to determine multiple lines of pixel units corresponding to the at least three line sequence numbers as the at least three lines of pixel units in which the pixel internal data is to be sensed.

13. The display device according to claim 11, wherein the display device further comprises an internal memory and an external memory, and the at least one instruction, the at least one program, the code set or the instruction set, when loaded and executed by the processor, causes the processor to perform:

each time the display device is switched on, detecting whether the abnormal sensing signal line is present in the plurality of sensing signal lines, and storing a detection result in the internal memory for use in the at least one full-screen sensing process;

or updating and storing in the external memory the detection result each time whether the abnormal sensing signal line is present in the plurality of sensing signal lines is detected, and reading the detection result stored in the external memory into the internal memory each time the display device is switched on, for use in the at least one full-screen sensing process.

14. The display device according to claim 11, wherein the at least one instruction, the at least one program, the code set or the instruction set, when loaded and executed by the processor, causes the processor to perform:

during an odd-numbered full-screen sensing, replacing the pixel internal data of the column of pixel units corresponding to each abnormal sensing signal line with pixel internal data of a column of pixel units on a left side of the abnormal sensing signal line; and during an even-numbered full-screen sensing, replacing the pixel internal data of the column of pixel units corresponding to each abnormal sensing signal line with pixel internal data of a column of pixel units on a right side of the abnormal sensing signal line;

or during an odd-numbered full-screen sensing, replacing the pixel internal data of the column of pixel units corresponding to each abnormal sensing signal line with pixel internal data of a column of pixel units on a right side of the abnormal sensing signal line; and during an even-numbered full-screen sensing, replacing the pixel internal data of the column of pixel units corresponding to each abnormal sensing signal line with pixel internal data of a column of pixel units on a left side of the abnormal sensing signal line.

15. The display device according to claim 11, wherein the at least one instruction, the at least one program, the code set or the instruction set, when loaded and executed by the processor, causes the processor to perform:

during an odd-numbered full-screen sensing, replacing the pixel internal data of the column of pixel units corresponding to each abnormal sensing signal line with pixel internal data of a column of pixel units on a right side of the abnormal sensing signal line; and during an even-numbered full-screen sensing, replacing the pixel internal data of the column of pixel units corresponding to each abnormal sensing signal line with an average value of pixel internal data of a column of pixel units on a left side of the abnormal sensing signal line and the pixel internal data of the column of pixel units on the right side of the abnormal sensing signal line;

or during an odd-numbered full-screen sensing, replacing the pixel internal data of the column of pixel units corresponding to each abnormal sensing signal line with an average value of pixel internal data of a column of pixel units on a left side of the abnormal sensing signal line and pixel internal data of a column of pixel units on a right side of the abnormal sensing signal line; and during an even-numbered full-screen sensing, replacing the pixel internal data of the column of pixel units corresponding to each abnormal sensing signal line with the pixel internal data of the column of pixel units on the right side of the abnormal sensing signal line.

* * * * *